(12) United States Patent
Abdul Aziz et al.

(10) Patent No.: US 11,627,440 B1
(45) Date of Patent: Apr. 11, 2023

(54) METHOD FOR IMPROVED AUDIO INTELLIGIBILITY IN A CONVERGED COMMUNICATION SYSTEM

(71) Applicant: MOTOROLA SOLUTIONS, INC., Chicago, IL (US)

(72) Inventors: Mohd Syazani Abdul Aziz, Coral Springs, FL (US); Lisajane M Romer, Delray Beach, FL (US); Cesar D Aguilar, Weston, FL (US); Harvey D Chambers, Sunrise, FL (US); Dajun Chen, Parkland, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 17/652,786

(22) Filed: Feb. 28, 2022

(51) Int. Cl.
*H04W 4/10* (2009.01)
*H04W 68/00* (2009.01)
*H04B 17/318* (2015.01)
*H04W 88/06* (2009.01)

(52) U.S. Cl.
CPC ............ *H04W 4/10* (2013.01); *H04B 17/318* (2015.01); *H04W 68/005* (2013.01); *H04W 88/06* (2013.01)

(58) Field of Classification Search
CPC .... H04B 17/318; H04B 1/1027; H04B 1/006; H04W 68/005; H04W 72/541; H04W 4/10; H04W 76/45; H04W 84/08; H04W 48/18; H04W 88/06

USPC ................... 455/404.1, 518, 519, 501, 552.1
See application file for complete search history.

(56) References Cited

U.S. PATENT DOCUMENTS

| | | | |
|---|---|---|---|
| 7,801,543 B2 | 9/2010 | Kasper et al. | |
| 8,036,716 B2 | 10/2011 | Dunn et al. | |
| 9,591,124 B2 * | 3/2017 | Corretjer | H04M 3/2236 |
| 10,015,207 B2 | 7/2018 | Karimli et al. | |
| 10,421,437 B1 * | 9/2019 | Koskan | G08B 21/0261 |
| 10,755,725 B2 * | 8/2020 | Subramanyam | G10L 15/1815 |
| 10,873,951 B1 | 12/2020 | Hiben et al. | |

* cited by examiner

*Primary Examiner* — Maria El-Zoobi
(74) *Attorney, Agent, or Firm* — Barbara R. Doutre

(57) ABSTRACT

A method and device for improved audio intelligibility in a converged land mobile radio (LMR)/broadband (BB) communications system is provided. A converged portable radio operating as part of a talkgroup in the LMR/BB system checks for predetermined triggers during standby that could cause receive radios of the talkgroup to receive degraded audio. If such a trigger is detected then the converged portable radio switches from the LMR system to the BB system and transmits a notification including a change system message to the other converged portable radios of the talkgroup. The notification is transmitted prior to any push-to-talk audio being transmitted from the originating radio. The converged portable radio can transmit, via a push-to-talk switch, narrowband (NB) audio and wideband (WB) audio in parallel over the BB system to the talkgroup subsequent to the detection of triggers and the sending of the notification.

19 Claims, 6 Drawing Sheets

Decision Table (Radios In Standby/Idle Mode)

| | Radio | WB Audio Capable | Poor Audio Accy Paired | In High Noise | Low RSS | Change To BB System For Audio | Send System Change Message |
|---|---|---|---|---|---|---|---|
| 502 | TX Radio A | Yes | No | No | No | No | No |
| 504 | TX Radio A | Yes | If Either Of These Is Yes | | No | Yes | Yes |
| 506 | TX Radio A | Yes | No | No | Yes | Yes | Yes |
| 508 | TX Radio A | No | Doesn't Matter | | Yes | Yes | No |
| 510 | TX Radio A | No | Doesn't Matter | | No | No | No |
| 512 | TX Radio A | Yes | No System Change Message Received | | Yes | Yes | Yes |
| 514 | RX Radio B | Yes | System Change Message Received | | No | *Yes | NA |
| 516 | RX Radio B | Yes | System Change Message Received | | Yes | *Yes | NA |
| 518 | RX Radio B | No | System Change Message Received | | No | No | NA |
| 520 | RX Radio B | No | System Change Message Received | | Yes | Yes | NA |

*NB LMR Preferred Configuration Receiving The System Change Message Will Be Informed/Requested To Move To WB BB

METHOD FOR IMPROVED AUDIO INTELLIGIBILITY IN A CONVERGED COMMUNICATION SYSTEM

BACKGROUND

Converged portable communication devices can operate on multiple communication systems, even communication systems that utilize different portions of the RF spectrum. Some converged portable communication devices can operate, for example, on a narrowband Land Mobile Radio (LMR) system for mission critical voice communications and a broadband (BB) system, such as a Long Term Evolution (LTE) system, for data communications or non-mission critical voice communications. However, speech intelligibility presents challenges to LMR voice communications taking place in public safety environments, such as fire rescue, law enforcement, and emergency environments where severe background noise may be present and cause audio intelligibility to degrade. Additionally, certain secondary electronic accessory devices which may be operated in conjunction with the portable communication device may be impacted by high levels of noise. For example, a self-contained breathing apparatus (SCBA) operating as a secondary accessory in communication with a primary converged portable radio may be negatively impacted by background noise at a public safety incident. It is important that audio intelligibility be maintained during mission critical communications.

Accordingly, a need exists for a method and system to improve audio intelligibility of a portable communication device operating in a converged communication system for operation in public safety environments.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

FIG. 5 is a Table of various use cases of the communication system in accordance with some embodiments.

Figure 1:
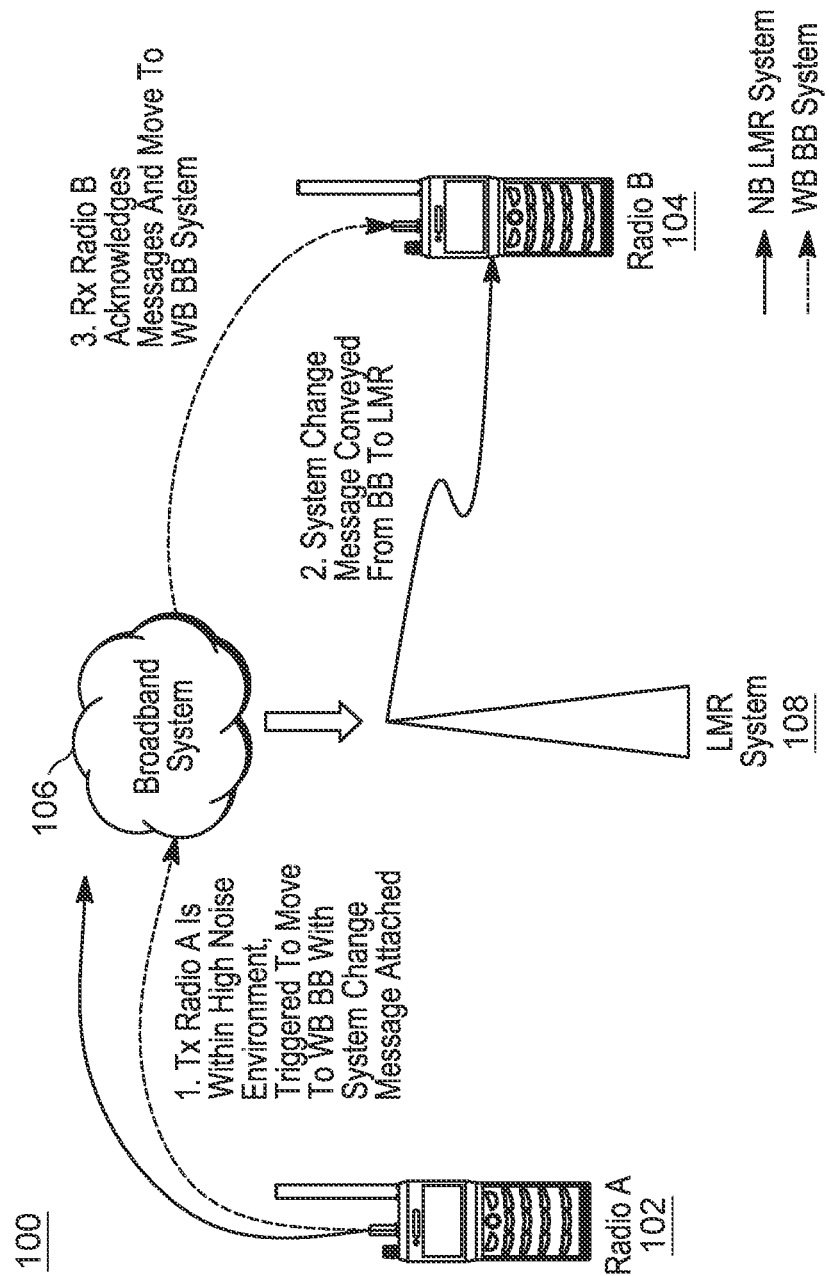
FIG. 1 is a diagram of a communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As part of Project 25 (P25) compliance for interoperability, land mobile radio (LMR) communications rely on the use of a P25 compliant narrowband (NB) audio vocoder having predetermined bit rates and sampling rates. The P25 compliant NB vocoder uses voice models and compression to try and accurately represent speech signals using very small amounts of data. When the signal-to-noise ratio (SNR) of speech in background noise starts to approach 0 dB, the noise levels approach the same level of speech, making the vocoder speech intelligibility start to degrade. Below 0 dB SNR, the vocoder speech intelligibility degrades significantly. Low SNR can be caused by high noise backgrounds, as well as low talk levels and poor usage practices.

While a noise suppression algorithm can significantly assist in raising the SNR level before the vocoder, there may still be occurrences where background noise can negatively impact speech intelligibility. For example, high noise environments may occur in fire ground communications (sirens, water, and machinery), vehicle pursuits, heavy highway traffic and the like. The problems can be exacerbated when a converged communication device transmit in a harsh noise environment, while a receive radio is attempting to receive on NB LMR.

Briefly, there is provided herein a method for automatic switchover from narrowband (NB) audio on an LMR system to wideband (WB) audio on a broadband (BB) system in response to predetermined triggers occurring at an originating transmit radio, prior to transmission of any push-to-talk (PTT) audio. The transmit radio further sends a notification including a change system message to one or more receive radios of a talkgroup indicating that the receive radio(s) should move to the wideband (WB) audio on the broadband (BB) system.

The embodiments provided herein advantageously eliminate any initial transmission of a poor audio signal. The notification is sent automatically by the transmit radio to the receive radio(s) in response to predetermined triggers occurring at the transmit radio. The receive radio(s) may switch systems automatically in response to the notification or the notification may be sent to the receive radio(s) as a user selectable option. The embodiments facilitate an end-to-end WB audio over BB system lineup to provide an optimum user-experience in harsh noise environments.

The communication system advantageously takes advantage of dual audio streams (NB audio stream and WB audio stream) being sent from the transmit radio in parallel over the BB system. The NB audio stream is P25 compliant. Only receive radios that are WB capable including a WB vocoder will use the WB audio stream. This approach maintains LMR feature transparency while providing improved audio intelligibility using WB audio over the BB system in an end-to-end lineup under certain trigger conditions.

FIG. 1 is a diagram of a communication system 100 formed and operating in accordance with some embodiments. Communication system 100 includes a first portable radio 102 and a second portable radio 104 established as a talkgroup operable over a converged communications network. The converged communications network comprises a land mobile radio (LMR) system 108 and a broadband (BB) system 106. The first converged portable radio 102 and second converged portable radio 104 form part of an established talkgroup, where portable radio 104 may represent a plurality of portable radios of the talkgroup operable over the converged communications system.

The LMR communication system 108 is a person-to-person voice communication system comprising two-way radio transceivers which can be portable (handheld), or mobile (installed in vehicles). For the purposes of this application, the benefits are best derived by portable communication devices. LMR communication systems are widely used by public safety and first responder organizations such as police, fire, and ambulance services, and other governmental organizations. The LMR communication system 108 is half-duplex, with multiple portable radios sharing a single radio channel, so only one portable radio can transmit at a time. The portable radio is normally in receive mode so the user can hear other radios (a talkgroup) on the channel. When a user wants to talk, for example in a talkgroup call, the user presses a push-to-talk (PTT) button on the portable radio, which turns on the transmitter of the portable radio. LMR communication system 108 includes various network elements that assist in facilitating communication, such as base stations and controllers, which are not shown for clarity purposes. LMR communication system 108 may include dispatch consoles, data applications, and RF conventional or trunked sites. Voice communication over the LMR system 108 is narrowband audio. WB audio will never go over the LMR system 108.

Broadband (BB) communication system 106 is a cellular system, such as a Long Term Evolution (LTE) system that supports packet switching over an-IP network. The LTE system includes gateways, servers, and controllers which are not shown for clarity purposes. Both wideband (WB) audio and narrowband (NB) audio can be transmitted over the BB communication system 106. However the audio quality of WB audio, due to its' WB vocoder audio information, over the BB system is superior to NB audio over the BB system.

The first and second portable radios 102, 104 are converged portable radios including controllers, transceivers and audio circuitry operational over the LMR system 108 and BB system 106. For the purposes of this application, the first portable radio 102 may also be referred to as transmit (TX) radio 102 or first converged portable radio 102, and the second portable radio 104 may also be referred to as receive (RX) portable radio 104 or second converged portable radio 104. The receive portable radio 104 may further represent additional receive converged portable radios of the talkgroup.

The first and second converged portable radios 102, 104 may be public safety radios that have a default audio operating mode preference of narrowband (NB) audio on the LMR system (NB LMR), used for mission critical audio. The first and second converged portable radios 102, 104 may (or may not be) be wideband (WB) audio capable but as previously mentioned are operational over the broadband system. Hence, wideband audio transmitted from the first portable radio can be played out of the second receiving portable radio 104 using either the LMR system 108 or the BB system 106.

The first and second converged portable radios 102, 104 have a default mode of NB LMR operation; however under this default mode of operation may not be optimum for all public safety environments, particularly high noise environments. The portable transmit radio 102 enables optimum system communications by switching from the LMR system to the BB system, in response to at least one predetermined trigger event, and further transmits a notification from the first portable radio 102 to the receive portable radio 104, the notification including a change system message.

In accordance with the embodiments, the communication system 100 enables dynamic switching from the LMR system to the BB system in response to at least one predetermined trigger event being incurred at the first portable radio 102. If such a trigger event occurs at first portable radio 102, then the first portable radio 102 will transmit the notification including the system change message will be transmitted through the BB system 106 to the second receive portable radio 104, indicating that the second portable radio should switch to the BB system.

The determination of trigger events and the sending of the notification will take place while the first portable radio 102 is in standby mode, also referred to as idle mode. The switch of the second portable radio 104 to the BB system will ensure improved receive audio communications, either via WB audio over the BB system or NB audio over the BB system (for radios that are not WB-capable). The switch of systems takes place prior to any PTT audio transmission, thereby ensuring optimized audio communication.

In accordance with the embodiments, the first portable radio 102 will switch from the LMR system to the BB system, in response to a determination that the first portable radio 102 is operating in a high noise environment. Such a determination is made by measuring environmental noise levels at a microphone of the first portable radio 102 during standby mode. The first portable radio will then transmit the notification including the change system message to the BB system 106. The BB system 106 will recognize that the second portable radio 104 is operating on its default preferred LMR system, and forward the notification with change of system message over the LMR system 108 for transmission to the portable radio 104. The transport manner in which the notification is sent through the system is provided for example purposes only, as long as the notification is sent and received prior to any PTT audio transmissions taking place. The second portable radio 104 acknowledges the message and moves to the BB system. If the first (transmit) converged portable radio 102 is wideband (WB) audio capable, then the second receive portable radio 104 will receive the WB audio over the BB system.

If the environmental noise level does not exceed the predetermined environmental noise threshold, then another trigger check can be made based on receive signal strength (RSS) of the first portable radio 102. In this case, the first portable radio 102 may switch from the LMR system to the BB system, in response to a determination that the first portable radio 102 has an RSS falling below a predetermined RSS threshold (weak RSS).

Such a determination is made by measuring the RSS of the first portable radio 102 during standby mode. No notification will be sent to the second portable radio 104, unless the first portable radio 102 is wideband capable and a trigger event has occurred (either high environmental noise or RSS at the transmit radio). In other words, if the transmit radio 102 is NB audio only, then there is no reason to send a system change message. If the first portable radio 102 is wideband capable and has a low RSS (weak) then the first portable radio switches to the BB system, and the notification including the change system message is sent to the second portable radio 104 over BB. The second portable radio 104 can then automatically acknowledge the notification and move to the BB system 106. The receive radio 104 may then receive WB audio over the BB system 106.

Alternatively, the second portable radio 104 may be presented with a user selectable option to switch to the BB system, allowing the user to either accept or decline. If the user declines, then audio communication will take place using the default NB audio over LMR. Users may also pre-configure their radios to automatically decline the system move and remain on NB audio over the LMR system.

In accordance with the embodiments, the environmental noise level trigger measured at the TX portable radio 102 takes precedence over the RSS trigger. The communication system 100 enables an end-to-end WB audio over BB system lineup for an optimum audio user-experience in harsh environments.

Figure 2:
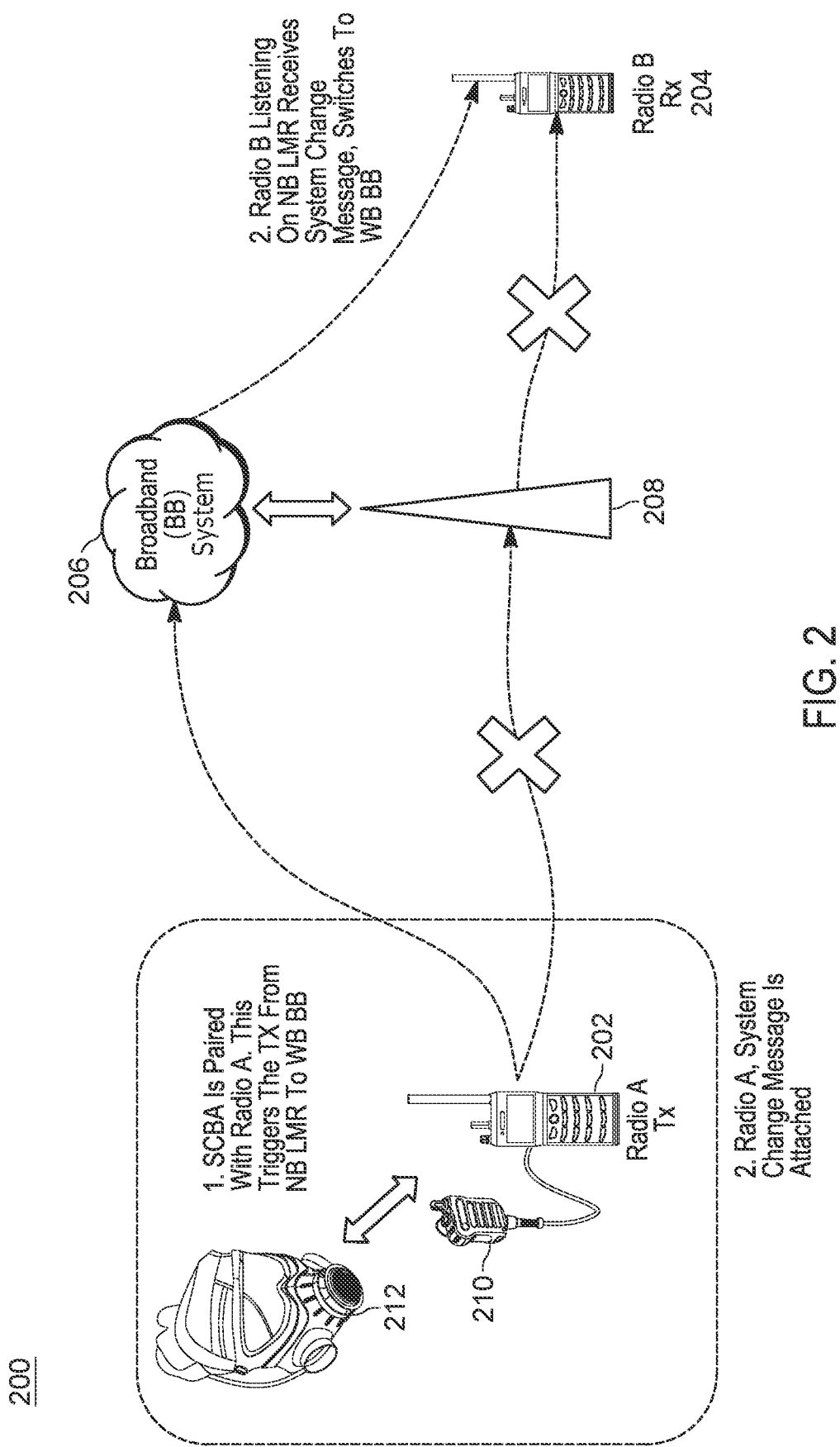
FIG. 2 is another diagram of a communication system in accordance with some embodiments.

FIG. 2 is another diagram of a communication system 200 in accordance with some embodiments. Communication system 200 is similar to communication system 100 including a first converged portable radio 202 and a second converged portable radio 204 operable in a converged system including a broadband (BB) system 206, and LMR system 208. Again, the first converged portable radio 202 and second converged portable radio 204 form part of an established talkgroup, where portable radio 204 may represent a plurality of portable radios of the talkgroup operable over the converged communications system. Communication system 200 further includes, a remote speaker microphone (RSM) 210 operatively coupled to the first portable radio 202, and further includes the addition of an accessory typically used in high noise environments, such as a SCBA mask, which communicates with the RSM 210 through to the first portable radio 202, and then from first portable radio 202 through the remainder of the system.

In the past, a firefighter wearing an SCBA mask in a harsh noise environment might hear thumping noises coming from their own gear due to the noise being processed through the NB vocoder of the first portable radio 102. If the first portable radio 202 is wideband capable and switches to the BB system, this will only provide improvement at the first portable radio 202 (minimize the thumping noise). If the first portable radio 202 is operating on WB BB within the harsh noise environment, and the second portable 204 is operating with an LMR preferred default, then the audio quality and intelligibility degradation will continue when the receiving radio continues to receive on NB LMR.

The embodiments, are therefore further advantageously applied to determine a trigger event based on detecting an accessory associated with high noise environments being operatively coupled (wired or wirelessly) to the first portable radio 202.

When the first portable radio 202 is in standby mode and either an SCBA is paired thereto and/or the environmental noise level is above a predetermined environmental noise threshold, then the first portable radio 102 moves to the BB system and sends a notification including the system change message to the second portable radio 204. The second portable radio 204 may then automatically move from the default LMR system to the BB system in response to receiving the notification. The second portable radio 204 is now ready to receive wideband audio over the BB system. Here again, the implementation of a WB BB end-to-end lineup adventurously provides the best user experience in harsh environments. Alternatively, if the notification is provided as a user-selectable option, then the second portable radio 204 may decline to switch systems and remain on the LMR system, wherein the second portable radio 204 will receive NB audio from the transmit portable radio 202 over the LMR system. As mentioned previously, WB audio will never go over the LMR system Both the high-noise accessory trigger and the environmental noise trigger take precedence over the RSS trigger. If the only trigger is the RSS trigger, then the first portable radio 202 moves to the BB system and sends the notification to the second portable radio 204. The second portable radio 204 then moves to the BB system for receiving WB audio over the BB system from the first portable radio 202. Alternatively, the second portable radio 204, if configured with a user selectable option or pre-configured preference, can decline to move to the BB system. If the receive portable radio declines or is pre-configured to decline the system move, then the second portable radio receives NB audio over the LMR system.

If no triggers occur at all (no accessory trigger, no environmental noise trigger, no RSS trigger) at the transmit radio 202, then both the first and second portable radios 202, 204 utilize the default NB audio on the LMR system.

Figure 3:
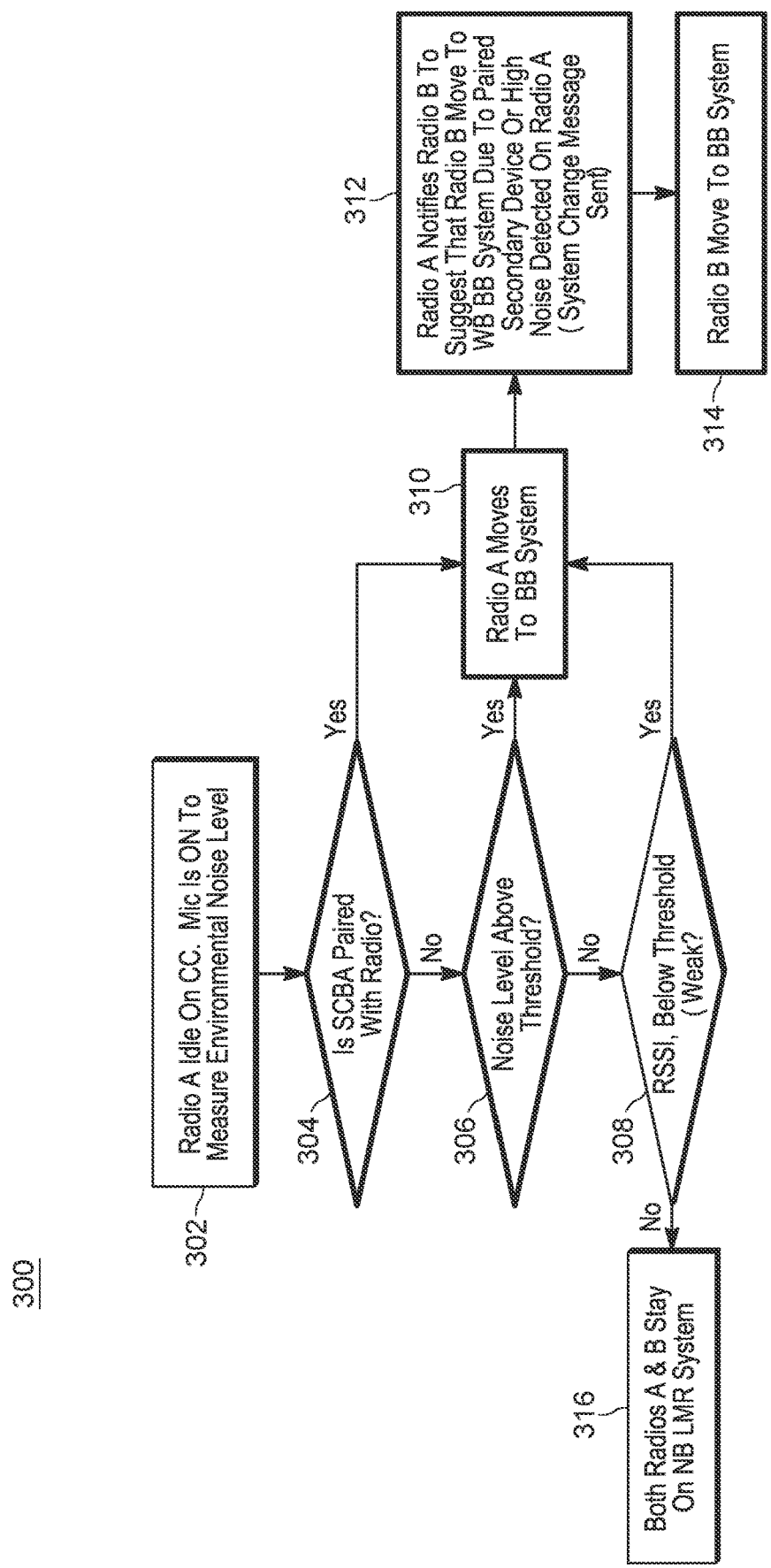
FIG. 3 is a flowchart of a method for improving audio intelligibility viewed from a transmit radio perspective in accordance with some embodiments.

FIG. 3 is a flowchart of a method 300 for improving audio intelligibility in the communication system viewed from a transmit radio perspective in accordance with some embodiments. The communication system is a converged communication system in which such as previously described in FIGS. 1 and 2.

The method begins at 302 with a first converged portable radio (radio A) of a talkgroup idling on a control channel (CC) (i.e. standby mode) and turning the radio's microphone ON to sample environmental noise. At 304, a check for a first trigger is made to determine if an accessory, normally associated with being operated in a high noise environment, is paired with the converged portable radio. For example, an SCBA accessory paired to the first portable radio would be considered a high noise accessory. The pairing of such an accessory results in the first portable radio switching from a default preferred LMR system to a BB system at 310.

If no accessory trigger is detected at 304, then the environmental noise measured is compared to a predetermined environmental noise threshold at 306. If the measured environmental noise is higher than the predetermined environmental noise threshold, then the first portable radio (Radio A) moves from the LMR system to the BB system at 310.

If the sampled environmental noise does not exceed the environmental noise threshold at 306, then a check of receive signal strength (RSS) of the first portable radio (Radio A) is made at 308 to determine if the RSS is below a predetermined RSS threshold.

If the RSS is below the predetermined RSS threshold at 308, then the RSS at the first portable radio (Radio A) is considered to be weak, and the first portable radio (radio A) moves from the LMR system to a BB system at 310.

If the RSS is not below the predetermined RSS threshold at 308, then both the first and second portable radios will communicate using NB audio on the LMR system at 316. Hence, both the first portable radio (radio A) and the second portable radio (Radio B) remain on the NB LMR system absent any poor accessory trigger, high environmental noise trigger, or weak RSS trigger.

Back at 310, once the first portable radio (Radio A) moves to the BB system, then the first portable radio (radio A) sends a notification to the second portable radio (Radio B) at 312 recommending that the second portable radio move to the BB system. As long as the first portable radio is wideband capable, the notification will be sent at 312; and the second portable radio (as long as second portable radio is WB capable and user configured setting is set to change to BB) will move to the BB system at 314.

Figure 4:
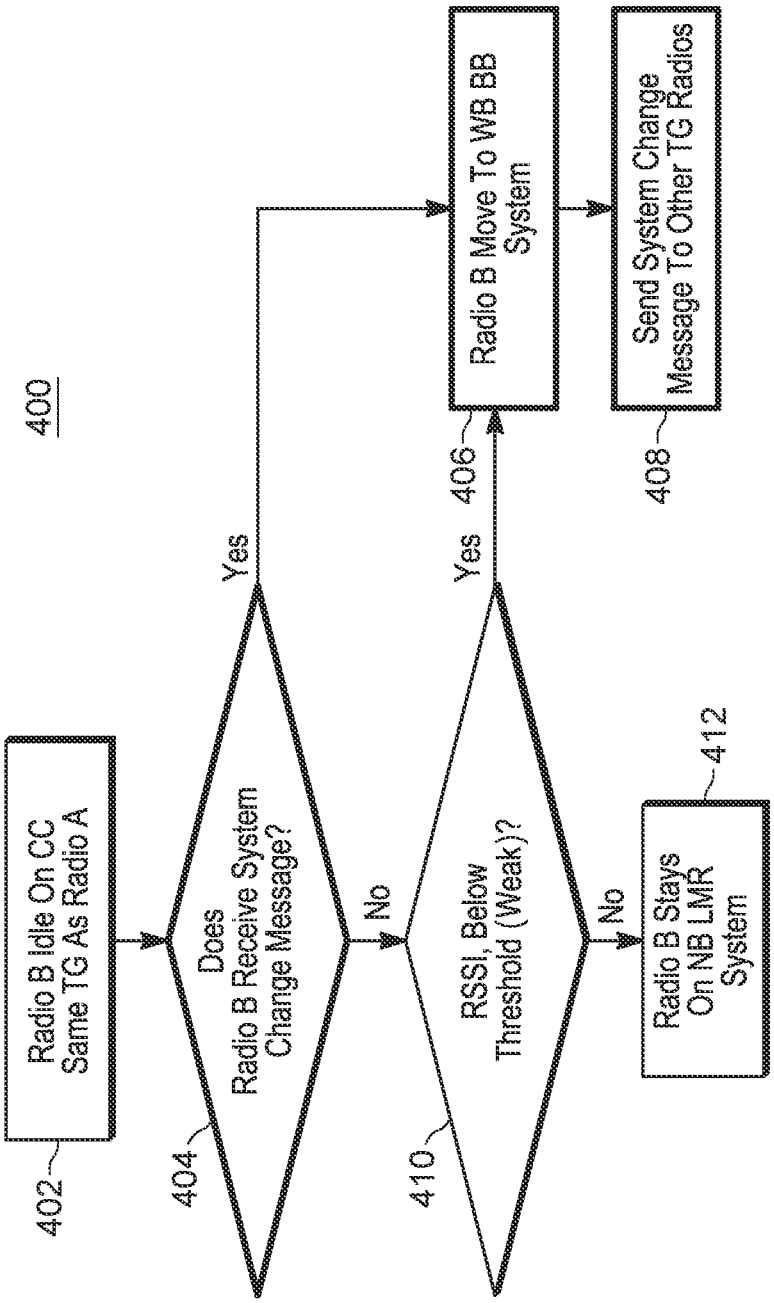
FIG. 4 is a flowchart of a method for improving audio intelligibility viewed from a receive radio perspective in accordance with some embodiments.

FIG. 4 is a flowchart of a method 400 for improving audio intelligibility in the communication system of FIGS. 1 and 2 viewed from the receive radio perspective in accordance with some embodiments. The method begins at 402 with the second portable radio (Radio B) of the talkgroup idling on the control channel (CC). In other words, the receive radio (Radio B) is in standby mode. If the second portable radio receives a notification to change to the BB system at 404, and accepts, then the second portable radio will move from its default preferred LMR system to the BB system at 406 where it will receive WB audio from the transmit radio of the talkgroup. The second portable radio can still receive NB audio though through the BB system (i.e. from other radios. Again, the system advantageously allows a radio to receive both WB audio and NB audio on the BB system.

Other portable radios within the talkgroup receive the notification including change system message in parallel with the second portable radio. In other words (receive Radio B represents many members of a talkgroup). Alternatively, if the second portable radio (Radio B) did not receive a notification but has a weak RSS, the second portable radio may change to the BB system and send a notification to other members of the talkgroup at 408. In other words, second portable radio (Radio B) can become the transmit radio.

If the second portable radio (Radio B) does not receive a notification including a system change message at 404 (i.e. no triggers of poor accessory pairing, high environmental noise or weak RSS detected at the first transmit portable radio), then the method moves to 410. At 410, the RSS of the second receive portable radio is measured and compared to a second predetermined RSS threshold.

If the RSS of the second portable radio (Radio B) does fall below the second predetermined RSS threshold (weak RSS) at 410, then the second portable radio will move to the BB system at 406 to receive WB audio from the first portable radio. Hence, even if a notification is not sent to the second portable radio, the weak RSS existing at that second portable radio is sufficient to cause a move to the BB system. If the second portable radio is WB capable, the second portable radio will receive WB audio over the BB system. If the second portable radio is not wideband capable, then it will receive NB audio over the BB system. In other words, it is preferable to receive NB audio over BB, than NB audio over LMR when a weak RSS is present on the receive side.

If the RSS of the second portable radio does not fall below the second predetermined RSS threshold (strong RSS), then the second portable radio (Radio B) stays on the default NB LMR system at 412. In other words, without any triggers or notification, and the presence of a strong RSS will maintain operation in the NB LMR system.

Various use cases are summarized in the Table 500 in accordance with some embodiments. Table 500 represents radios of a talkgroup operating in standby mode and the conditions under which system changes are made from LMR system to BB system. Table 500 indicates whether the first portable radio, such as first portable radio 102 or 202 is wideband capable, and then lists the triggers (poor audio accessory paired to radio, high environmental noise, weak RSS) and then the decision as to change to BB system (from LMR) and whether a notification including a System Change Message" will be sent from the transmit radio A to the receive radio B. Rows 502-510 are viewed from the first portable radio transmit view perspective, and rows 512-520 are viewed from the receive portable radio perspective.

At row 502, if transmit Radio A is a WB audio capable and none of the three triggers occurrences, then there is no need for any change of system or notification to the second receive radio. The first and second radios will communicate using NB audio over the LMR system, At row 504, if the transmit Radio A is a WB audio capable that has either a poor audio accessory paired thereto or is operating in a high noise environment, then the transmit Radio A will switch to the BB system and send a notification including the system change message to the receive Radio B. Either of these two triggers (poor accessory or high noise environment) takes precedence over the RSS trigger. In other words, either of these two triggers will cause a system change and notification regardless of the RSS of the transmit Radio A.

By contrast, at 506, if the transmit Radio A is WB audio capable that does not have a poor audio accessory attached thereto and is not operating in a high noise environment, but does have a low (weak) RSS, then this low RSS trigger alone is sufficient to enable the first transmit Radio A to change to the BB system, and to further enable the transmit Radio A to send a notification indicating a system change message to the receive Radio B.

At 508, if the transmit Radio is not WB audio capable and only incurs a low RSS trigger, then the low RSS alone is sufficient to trigger the change to of the transmit Radio A to the BB system; however no notification will be sent. Thus, the transmit Radio A will change to the BB system but will transmit NB audio. The receive radio will receive the NB audio from whatever system it's currently connected to—which is dependent upon the receive radio's own RSSI value.

At 510, if the transmit Radio A is not WB audio capable, (and regardless of any accessory or high noise triggers), and does not have a low RSS, then there is no need for the transmit Radio A to switch to the BB system, and no message will be sent to the receiver radio. In other words a high RSS at the transmit radio negates any need to change to a BB system or send any message, even if some of the other triggers are present.

Moving to the receive radio perspective, at 512, Radio B is sitting idle on a control channel (CC) just like radio A in 506, and no notification was received (because there were no triggers at the transmit side). However, at 512, if Radio B goes RSS low (weak RSS), then Radio B will change to the BB system. Radio B will then send a notification including change of system message to other radios in its talkgroup to change to the BB system. In this case the audio transmission is then initiated by radio B (i.e. radio B becomes a Tx radio).

If the receive Radio B is WB capable and receives the change notification from Radio A, then Radio B will change to the BB system (514, 516), regardless of RSS at Radio B.

If the receive radio is not WB capable, and has a strong RSS, then it will not change to the BB system (518). If the receive radio is not WB capable, then the only time it will change to BB is with a low RSSI value (520).

Figure 6:
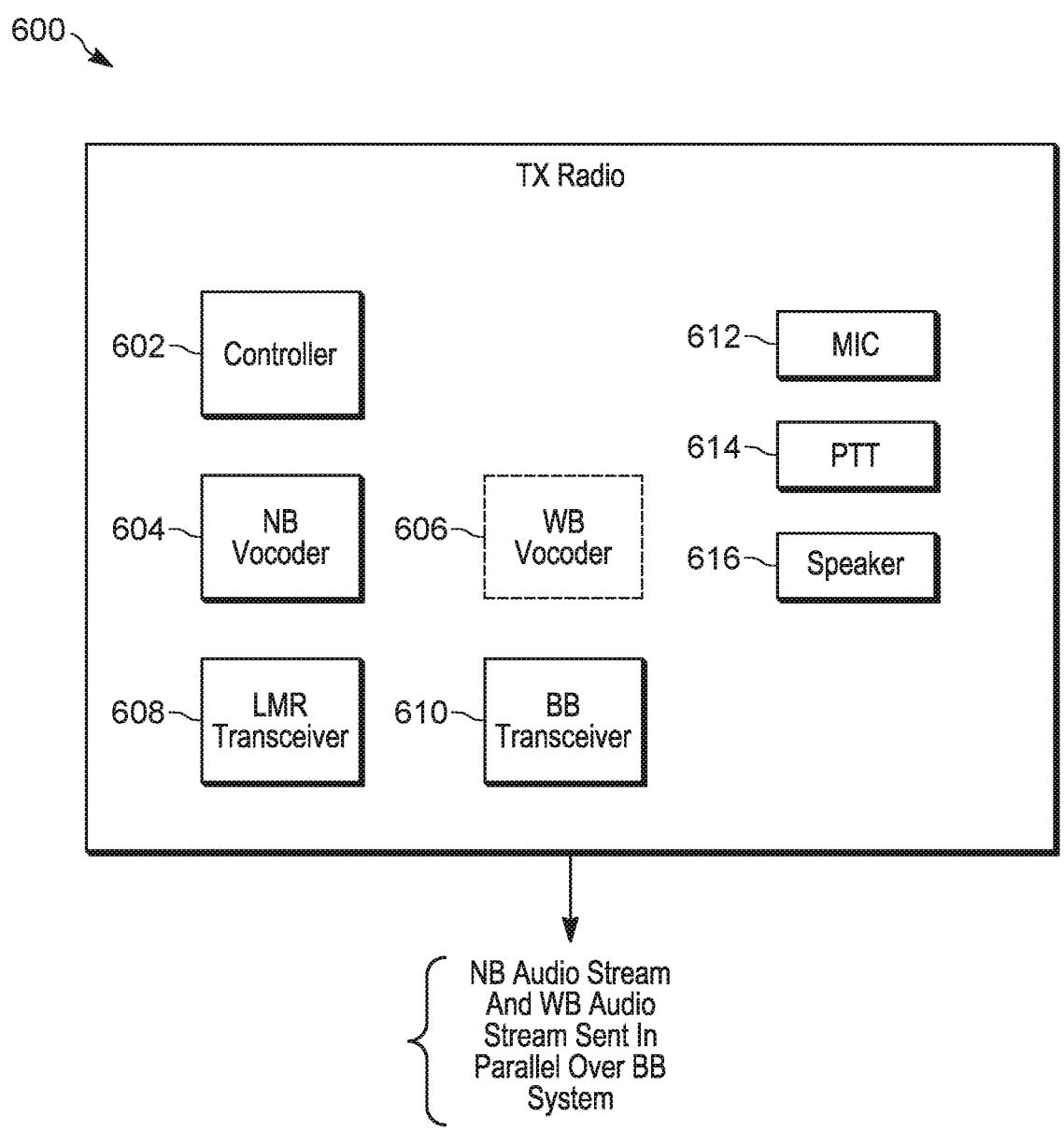
FIG. 6 is a block diagram of a converged portable radio in accordance with some embodiments.

FIG. 6 is a block diagram of a converged portable radio 600 in accordance with some embodiments. The converged portable radio 600 is provided to show, at a high level, some of the radio elements previously described, such as a controller 602, which may include, for example, one or more processors, control circuitry, logic gates, and the like. The controller 602 manages operation of other radio elements, such as audio circuitry which includes, for example, a narrowband (NB) vocoder 604 and preferably a wideband (WB) vocoder 606. For example wideband audio capability was described in relation to Table 5 at 502, 504, 506 which would include the WB vocoder 606, while conditions described at Table 5 at 508, 510 cover situations where the portable radio is still a converged portable radio (operates in both LMR and BB systems)—but does not include a WB vocoder/or the WB vocoder is not operational. The converged portable radio further includes a land mobile radio (LMR) transceiver, and a broadband (BB) transceiver 610, for example an LTE transceiver. Portable radio 600 further includes a microphone (MIC) 612, a push-to-talk (PTT) switch 614, and a speaker 616. Interoperability between blocks is considered to be understood and not shown to maintain simplicity.

The converged portable radio 600 operates, as previously described, as part of a talkgroup in an LMR/BB system. Converged portable radio 600 checks for predetermined triggers during standby that could cause receive radios of the talkgroup to receive degraded audio. The triggers detected during standby may include high environmental noise, noise-susceptible accessory attached to the radio, and/or RSS at the radio 600. If such a trigger is detected then the converged portable radio 600 switches from the default LMR system to the BB system and transmits a notification including a change system message to the other converged portable radios of the talkgroup. The notification is transmitted prior to any PTT audio being transmitted from the originating radio 600. The converged portable radio 600 then transmits, via the PTT switch 614, narrowband audio and wideband audio in parallel over the BB system to the talkgroup subsequent to the detection of triggers and the sending of the notification. This approach ensures improved audio intelligibility in the converged system. The notification is transparent to the user of converged portable radio 600. The receipt of the notification by other members of the talkgroup may be transparent allowing for an automatic system change, or the notification may be provided as a user selectable option to the user.

The system, device and method provided by the various embodiments advantageously improve audio intelligibility in a converged communication system, by only switching to the BB system for a wideband audio capable radio when it is determined that the radio's NB audio on the LMR system would be impacted by one of the triggers (high environmental noise trigger or poor accessory trigger). If neither trigger occurs, a further check for an RSS trigger can be made, so that a weak RSS radio can move to the BB system. The embodiments advantageously eliminate any initial transmission of a poor audio signal, thereby improving the user experience.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising an electronic processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for improving audio intelligibility in a converged communications system, the converged communication system including a land mobile radio (LMR) system and a broadband (BB) system, the method comprising:
    establishing a talkgroup of a first portable radio and a second portable radio, each portable radio being operable over the converged communications system;
    enabling a microphone at the first portable radio operating in standby mode;
    measuring environmental noise captured by the microphone in the standby mode;
    determining one of a plurality of trigger events at the first portable radio while in standby mode, the plurality of trigger events comprising one of:
        detecting when an accessory associated with high noise environments is operatively coupled to the first radio;
        detecting when a measured noise level is above a predetermined noise threshold at the first radio;
    switching the first portable radio from the LMR system to the BB system in response to either of the triggers events occurring; and
    transmitting a notification from the first portable radio to the second portable radio, the notification including a system change message instructing the second portable radio to move to the BB system based on the trigger, the notification being transmitted prior to any push-to-talk audio being transmitted; and
    transmitting, via a push-to-talk switch, narrowband (NB) audio and wideband (WB) audio in parallel over the BB system to the second portable radio subsequent to either of the triggers and the notification.

2. The method of claim 1, wherein the notification is user-transparent, and the second portable radio moves to the BB system automatically in response to the notification.

3. The method of claim 1, wherein the notification is transmitted to the second portable radio as a user selectable option.

4. The method of claim 1, wherein broadband communication system is a long term evolution (LTE) system.

5. The method of claim 1, further comprising (506):
    determining a further trigger event when neither the accessory trigger nor the environmental noise trigger occurs, the further trigger comprising:
        detecting a receive signal strength (RSS) being below a predetermined RSS threshold indicative of a weak RSS at the first radio;
    switching the first portable radio from the LMR system to the BB system in response to the weak RSS at the first portable radio;
    transmitting the notification from the first portable radio to the second portable radio including a system change message recommending that the second portable radio move to the BB system based on the RSS trigger alone; and
    transmitting, via the push-to-talk switch, NB audio and WB audio in parallel over the BB system to the second portable radio subsequent to the RSS trigger and the notification.

6. The method of claim 1, further comprising (514, 516):
    receiving the notification of system change message at the second portable radio; and
    if the second receive portable radio is wideband (WB) audio capable, then changing to the BB system at the second portable radio to receive WB audio on the BB system.

7. The method of claim 6, further comprising (518):
    if the receive radio is not WB capable, and the receive radio has a receive signal strength (RSS) above a predetermined RSS threshold indicative of a strong RSS, then the receive radio does not change to the BB system and remains on the LMR system to receive NB audio.

8. The method of claim 7, further comprising (520):
    if the receive radio is not WB capable, and has a receive signal strength (RSS) below a predetermined RSS threshold indicative of a weak RSS, then the receive radio changes to the BB system to receive NB audio.

9. A converged portable radio operating in a converged land mobile radio/broadband (LMR/BB) system, the converged portable radio comprising:
    a processor configured to:
        measure environmental noise at the converged portable radio during a standby mode of operation, the converged portable radio being part of a talkgroup;
        determine one of a plurality of trigger events at the converged portable radio, the plurality of trigger events comprising:
            detect an accessory associated with high noise environments operatively coupled to the converged portable radio;
            measure an environmental noise level above a predetermined environmental noise threshold;
        switch the converged portable radio from the LMR system to the BB system in response to either of the triggers events occurring; and
        transmit a notification from the converged portable radio to other converged portable radios of the talkgroup, the notification including a change system message to move to the BB system, the notification being transmitted prior to any push-to-talk audio being transmitted; and
        transmit, via a push-to-talk switch of the converged portable radio, narrowband (NB) audio and wideband (WB) audio in parallel over the BB system to the second portable radio subsequent to either of the triggers and the notification.

10. The converged portable radio of claim 9, wherein the notification is user-transparent, and the other converged portable radios of the talkgroup automatically move to the BB system in response to the notification.

11. The converged portable radio of 9, wherein the notification is transmitted from the converged portable radio as a user selectable option to the other converged portable radios of talkgroup.

12. The converged portable radio of claim 9, wherein the processor of the converged portable radio is further configured to determine a further trigger event when neither the accessory trigger nor the environmental noise trigger occurs, the further trigger event comprising:

detect a receive signal strength (RSS) trigger being below a predetermined RSS threshold indicative of a weak RSS at the converged portable radio;

switch the converged portable radio from the LMR system to the BB system in response thereto; and transmit the notification from the converged portable radio to the other converged portable radios of the talkgroup, the notification including the system change message recommending that the other members of the talkgroup move to the BB system; and transmit, via the push-to-talk switch of the converged portable radio, NB audio and WB audio in parallel over the BB system to the other converged portable radios of the talkgroup, subsequent to the RSS trigger and the notification.

13. The converged portable radio of claim 9, wherein the accessory is a noise-susceptible accessory comprising a self-contained breathing apparatus operatively coupled to the converged portable radio.

14. A method of operating a converged portable radio in a converged land mobile radio/broadband (LMR/BB) communication system, comprising:

operating the converged portable radio in standby, the converged portable radio having a preferred default operating mode on the LMR system;

moving to the BB system in response to detecting one of a plurality of triggers comprising:

detecting that an accessory associated with high noise environments is operatively coupled to the converged portable radio;

detecting that measured environmental noise is above a predetermined environmental noise threshold at the converged portable radio;

switching the converged portable radio to the BB system in response based on the detected the trigger;

transmitting a notification from the converged portable radio to other converged portable radios within a talkgroup, the notification including a system change message instructing the other converged portable radios of the talkgroup to move to the BB system based, the notification being transmitted prior to any push-to-talk audio being transmitted; and transmitting, via a push-to-talk switch of the converged portable radio, narrowband (NB) audio and wideband (WB) audio in parallel over the BB system to the other converged portable radios of the talkgroup radio subsequent to either of the triggers and the notification.

15. The method of claim 14, wherein the converged portable radio operates over a preferred default operating mode on the LMR system.

16. The method of claim 14, wherein moving to the BB system in response to detecting one of a plurality of triggers further comprises:

determining a further trigger event when neither the accessory trigger nor the environmental noise trigger occurs, the further trigger event comprising:

detect a receive signal strength (RSS) being below a predetermined RSS threshold at the converged portable radio;

switching the converged portable radio from the LMR system to the BB system in response thereto; and transmitting the notification including the system change message.

17. The method of claim 14, wherein the notification is user-transparent.

18. The method of claim 14, wherein the notification is transmitted to the other converged portable radios of the talkgroup as a user selectable option.

19. The method of claim 14, wherein the accessory is a noise-susceptible accessory comprising a self-contained breathing apparatus operatively coupled to the converged portable radio.

* * * * *